No. 790,730. PATENTED MAY 23, 1905.
C. HOELSCHER.
APPARATUS FOR EXHAUSTING INCANDESCENT LAMP BULBS.
APPLICATION FILED FEB. 15, 1905.

Witnesses
Jno Imirie
Francis P. Maguire

Christian Hoelscher, Inventor
By
Attorney

No. 790,730. Patented May 23, 1905.

UNITED STATES PATENT OFFICE.

CHRISTIAN HOELSCHER, OF WARREN, OHIO.

APPARATUS FOR EXHAUSTING INCANDESCENT-LAMP BULBS.

SPECIFICATION forming part of Letters Patent No. 790,730, dated May 23, 1905.

Application filed February 15, 1905. Serial No. 245,778.

*To all whom it may concern:*

Be it known that I, CHRISTIAN HOELSCHER, of Warren, in the county of Trumbull and State of Ohio, have invented certain new and useful Improvements in Apparatus for Exhausting Incandescent-Lamp Bulbs; and I do hereby declare the following to be a full, clear, and exact description of the invention, such as will enable others skilled in the art to which it appertains to make and use the same.

The object of this invention is to provide means for evacuating incandescent electric lamps in a more expeditious and effective manner than has heretofore been possible.

The invention will be hereinafter fully set forth, and particularly pointed out in the claims.

Figure 1:
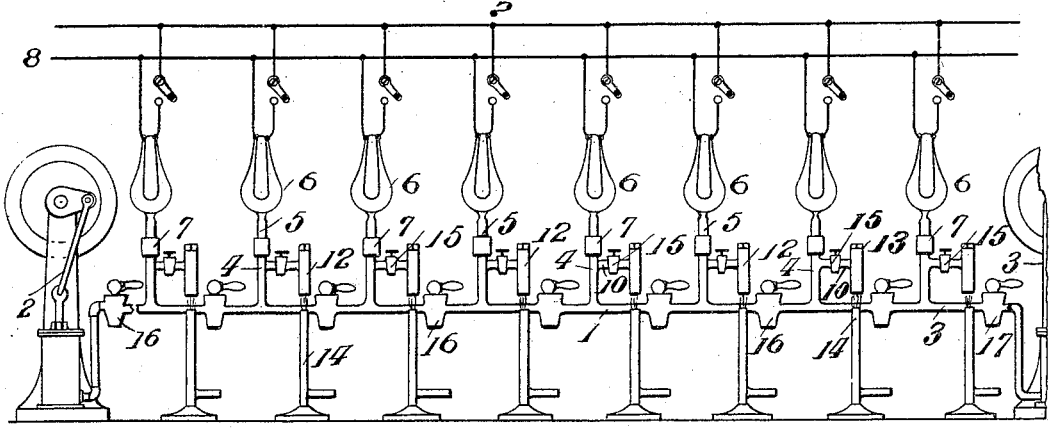
Figure 2:
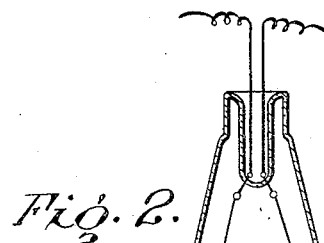

In the accompanying drawings, Figure 1 represents the general organization for carrying out my invention. Fig. 2 is an enlarged fragmental view thereof, partly in section.

Referring to the drawings, 1 designates a tube leading from a main vacuum-pump 2 at one end and a second vacuum-pump 3 at the other end. From tube 1 rise a series of tubular branches 4, to which the tubulatures 5 of incandescent lamps 6 are designed to be held by short sections 7, of rubber or other suitable material, for retaining the lamp-bulbs in place. The filaments of the several lamps are preferably placed in electric connection with a conductor 8, supplied with currents of electricity from a main in any convenient manner. Rising centrally from the tubular branches 4 are small pipes 9 of such lengths as to extend well up into the tubulatures of the lamps. These pipes 9 at their lower ends extend through laterals 10 of the several tubular branches 4, leading from reservoir 12, supported by said lateral branches. These reservoirs are designed to contain suitable chemicals, which will readily combine when heated with the remnant of gases released during the final incandescence of the filaments. Each reservoir is closed by a removable plug 13. The chemicals within the reservoirs are subjected to the action of heat, preferably by burners 14, located thereunder, although it is obvious that any suitable means may be employed. Communication between each chemical-containing reservoir and a lamp-bulb is controlled by a valve or cock 15, passed transversely through pipe 9 and the lateral branch 10.

Within tube 1, between each of the tubular branches 4, is located a valve or cock 16, a similar valve or cock being between vacuum-pump 2 and the next adjacent tubular branch 4. A valve or cock 17 is also located in tube 1 for controlling communication between such tube and pump 3. This latter pump is for the purpose of effecting a preliminary exhaust from the several lamps mounted on tube 1 before the gases are admitted and communication established with pump 2.

In practice the operator works from right to left, cutting off the supply of gas, lowering the current to the normal candle-power, and sealing off each lamp-bulb, one at a time, communication between the lamp-bulb undergoing sealing and vacuum-pump 2 being closed by turning the adjacent cock 16. A new lamp is immediately substituted for each one removed. The operation will be better understood by describing the treatment accorded the second and successive series of lamps. As the last or left-hand lamp is sealed off and a new one substituted the cock 17 is closed, thereby cutting off pump 3, by which a preliminary exhaust has been effected from each of the new supply of lamps. Pump 2 is then brought into action, the left-end cock 16 being opened, the electric current is thrown on in full, and all the gas-controlling valves 15 are opened to admit the gases to the several lamp-bulbs. The current being thrown into the filaments to a high incandescence and the required high degree of vacuum being obtained, the further flow of the gases is discontinued by closing valves 15. The current then being lowered to the normal candle-power required of each lamp, the operator begins to seal off, remove, and replace each bulb, working from right to left. First, the next adjacent cock 16 is closed to cut off communication with vacuum-pump 2, and after a new bulb is substituted cock 17 is opened up, so that a preliminary exhaust may be effected by pump 3. Cock 16, between the second and third lamps, is then closed, and after the second lamp has been sealed off and a new one substituted the first closed cock 16 is opened to allow of the preliminary exhaust of the second as well as the first lamp. Then the cock between the third and fourth lamps is closed, while such lamp is likewise sealed off and a new one substituted. It will be observed that as soon as a new lamp is substituted the cock 16 to the right thereof is opened up, so as to allow of the preliminary exhaust by the action of pump 3, the cock to the left cutting off communication with the vacuum-pump 2. When the operator reaches the final lamp—that is, the one at the extreme left—before sealing off such lamp the end cock 16 is closed; but after sealing such lamp and substituting a new one such cock is again opened, cock 17 being closed to cut off further communication with the preliminary-exhausting pump. The current is then put in full on all the lamps and by the appearance of the gas proves whether or not proper evacuation has been effected before the lamps of the new series are removed. Thus it will be seen that all of the lamps are subjected to the actions of the pumps for a much longer time than would be possible were they treated singly or in pairs or dependent upon a single pump. In the organization shown in the drawings each lamp is acted on by the pumps about eight times as long as it would be if but one lamp were treated at a time. This enables me to obtain the very best vacuum. Should it be found at the time a lamp is about to be sealed that the desired vacuum has not been obtained, the operator may admit additional gases thereto without interfering with any of the other lamps.

I claim as my invention—

1. In an apparatus for exhausting a series of incandescent-lamp bulbs, means for simultaneously exhausting all of the lamp-bulbs, means for controlling communication with said former means and each of the lamp-bulbs, and means for effecting a preliminary exhaust of each lamp-bulb as it is secured in place without interfering with the exhausting of the remaining lamps by the first-mentioned exhausting means.

2. The herein-described apparatus for exhausting incandescent-lamp bulbs, comprising a main tube having means for supporting and establishing communication with a series of lamp-bulbs, means for admitting gases to each lamp-bulb, means for preliminarily exhausting each lamp-bulb, and means for exhausting all of them synchronously.

3. The herein-described apparatus for exhausting incandescent-lamp bulbs, comprising a main tube having means for supporting and establishing communication with a series of lamp-bulbs, means for admitting gases to each lamp-bulb, two vacuum-pumps with which said tube is connected, and means for controlling communication between each lamp-bulb and said pumps.

4. The herein-described apparatus for exhausting incandescent-lamp bulbs, comprising a main tube having means for supporting and establishing communication with a series of lamp-bulbs, means for admitting gases to each lamp-bulb, two vacuum-pumps with which said tube is connected, a series of valves in said tube for cutting off communication between each lamp-bulb and both pumps and for allowing communication with one pump while that with the other is closed.

5. The herein-described apparatus for exhausting incandescent-lamp bulbs, comprising a main tube having a series of upright branches, means for connecting a series of electric-lamp bulbs to such branches, chemical-holders mounted on said uprights and designed to communicate with such lamp-bulbs through the tubulatures thereof, means for controlling the passage of gases from said chemical-holders to said lamp-bulbs, means for exhausting said lamp-bulbs, and means for controlling communication between each bulb and the exhausting means.

6. The herein-described apparatus for exhausting incandescent-lamp bulbs, comprising a main tube having a series of upright branches, means for connecting a series of electric-lamp bulbs to such branches, chemical-holders mounted on said uprights and designed to communicate with such lamp-bulbs through the tubulatures thereof, means for controlling the passage of gases from said chemical-holders to said lamp-bulbs, means for effecting a preliminary exhaust from each lamp-bulb as it is placed in position, means for simultaneously exhausting all of the lamp-bulbs when the preliminary exhaust is discontinued, and means for cutting off communication with each lamp-bulb independently of the others.

7. The herein-described apparatus for exhausting incandescent-lamp bulbs comprising a main tube, a series of upright branches to each of which an incandescent-lamp bulb is designed to be secured, chemical-holders for communicating with each lamp-bulb, means for controlling such communication, two pumps connected to opposite ends of said tube, and a series of valves located in said tube for controlling communication between each of the pumps and the lamp-bulbs.

In testimony whereof I have signed this specification in the presence of two subscribing witnesses.

CHRISTIAN HOELSCHER.

Witnesses:
 FRANK S. CHRYST,
 JOHN R. LACHMAN.